Aug. 19, 1947.  C. H. HALL  2,425,736
OVERLOAD RELEASE MECHANISM
Filed May 17, 1945
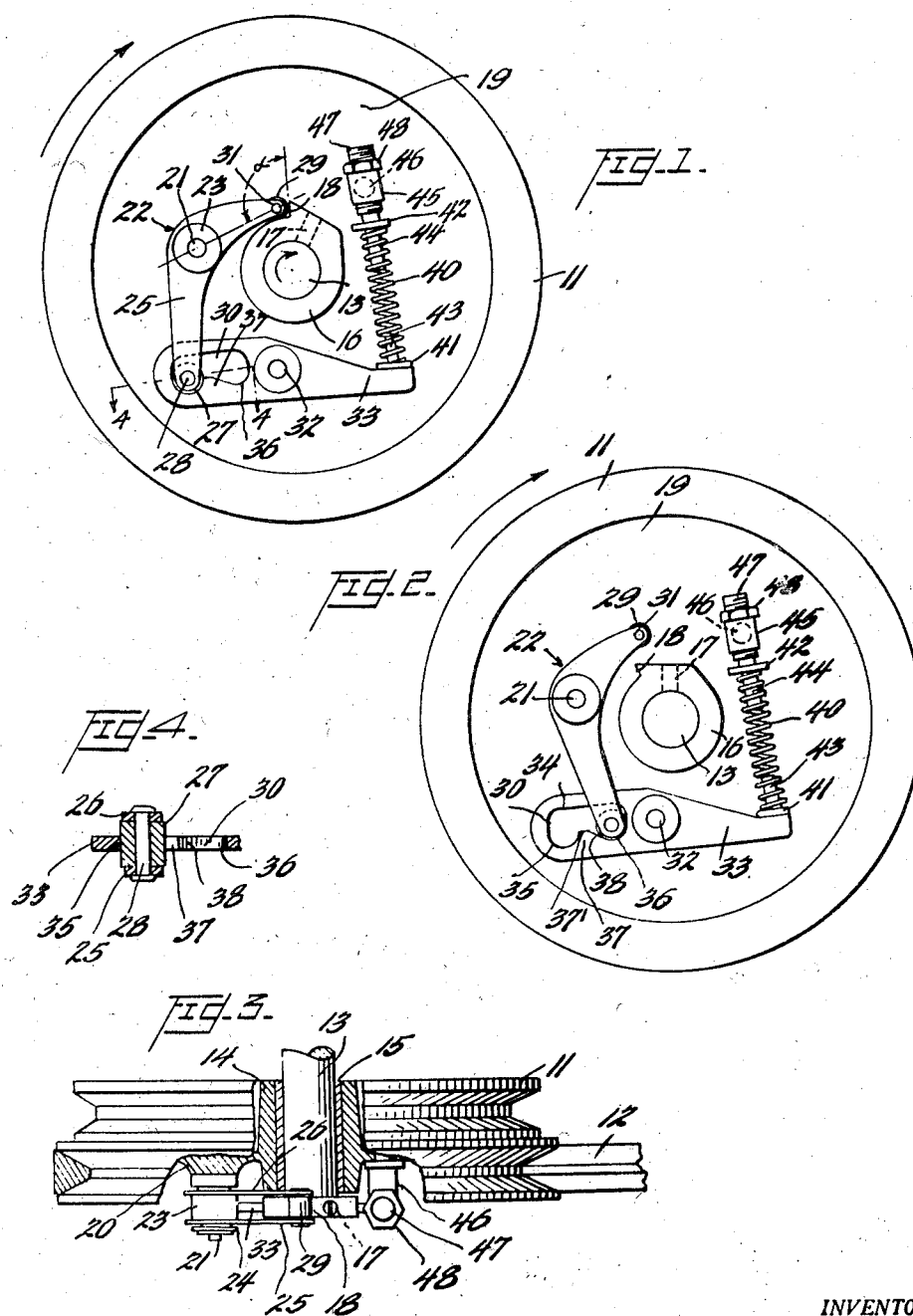
INVENTOR.
Cortice H. Hall,
BY Strauch & Hoffman
Attorneys Patented Aug. 19, 1947

2,425,736

UNITED STATES PATENT OFFICE 2,425,736

OVERLOAD RELEASE MECHANISM

Cortice H. Hall, Detroit, Mich., assignor to The Timken-Detroit Axle Company, Detroit, Mich., a corporation of Ohio Application May 17, 1945, Serial No. 594,323

9 Claims. (Cl. 192—56)

REISSUED
APR 24 1951
RE 23366

1

This invention relates to overload release mechanism for disconnecting a rotating driving member from a motor driven thereby when the transmitted torque exceeds a predetermined amount and is particularly concerned with such overload release mechanism for interrupting the drive of a material feed shaft by a motor or the like, as in a mechanical coal stoker, where the feed may become clogged or blocked by large pieces of coal or solid foreign material.

Various forms of torque responsive overload release devices have been suggested for use in web feeding machinery, coal stokers and other apparatus, but few if any of these devices are embodied in commercially produced coal stokers, the function being accomplished usually by conventional shear pins which break when the torque exceeds a certain amount. The difficulty with such shear pins is that, although they perform the drive breaking function adequately when properly designed, the device must usually be partially dismantled in order to replace them and this requires time and labor.

Various types of resettable overload release devices have also been proposed but these are mainly relatively complicated or of such other practically objectionable nature that their use has not become general.

In the present invention I provide a mechanically simple overload release mechanism which breaks the driving connection cleanly and very rapidly when subjected to a predetermined torsional overload and which is easy to reset when the cause of the overload condition has been remedied. My mechanism is such that it may be carried on a conventional part of the usual drive for a stoker feed or the like, so that it may be adapted into an existing installation with minimum conversion.

With the above in mind, it is a major object of my invention to provide a novel, mechanically simple and inexpensive and reliably operable overload release mechanism adapted to interrupt a drive connection between a rotatable driving member and a driven member when the torque transmitted thereby exceeds a predetermined amount.

A further object of the invention is to provide a novel extremely sensitive and rapidly acting overload release mechanism operable to interrupt a drive connection in response to minimum torsional overload.

A further object of the invention is to provide a novel cam and resiliently biased lever assembly adapted for positively transmitting a driving

2 torque and adapted to break the drive when a predetermined torque is exceeded, and which is easily and conveniently resettable without dismantling any of the assembly and associated apparatus.

A further object of the invention is to provide a simple torsional overload release mechanism embodying novel adjustment means for preselecting the critical torque beyond which the drive is broken.

Further objects of the invention will presently appear as the description proceeds in connection with the appended claims and the annexed drawings in which:

Figure 1 is an end elevation of an overload release mechanism according to a preferred embodiment of my invention mounted on a drive pulley, illustrative of a rotary driving member, for rotating a shaft such as the feed drive shaft of a coal stoker conveyor, illustrative of the driven member in the assembly, and illustrating the parts in set relation where the drive and driven members are positioned for transmission of torque through the mechanism;

Figure 2 is an end elevation of the mechanism of Figure 1 illustrating the position of the parts when drive has been interrupted, as when the mechanism has been overloaded by restraining rotation of the driven shaft;

Figure 3 is a side elevation, partly in section, illustrating constructional details of the mechanism of Figure 1 as mounted on the drive pulley; and Figure 4 is a fragmentary sectional view taken substantially along line 4—4 in Figure 1 illustrating the connection between the drive arm and the release rocker bar in the mechanism of Figure 1.

In its preferred embodiment the invention is especially adapted for interrupting the drive between a power plant such as an electric motor and a rotatable shaft driving a coal stoker conveyor worm such as may be subject to restraining or blocking of rotation as when an oversized piece of coal, stone or iron may become accidentally blocked therein. It will be understood that the invention is not so limited, however, and can be applied to any apparatus wherein a similar overload release problem is presented.

In the illustrated embodiment of the invention, the driving member of the mechanism is a grooved pulley 11 adapted to be continuously rotated by a suitable electric motor (not shown) to which it is coupled by a driving belt 12, the disposition of belt 12 in one or the other of the different diameter grooves of pulley 11 determining the speed of rotation of the pulley. This pulley may be substantially of the same structure as the usual pulley which is employed in a conventional type stoker worm drive, and all of the overload release mechanism of the invention is carried by the pulley, whereby a novel pulley and associated release mechanism of the invention may be simply substituted for the standard pulley in a conventional stoker feed mechanism. No other alteration in the stoker feed is necessary. The device may be installed by unskilled workmen, and it takes up no more space than a standard pulley.

The driven member in the illustrated embodiment of the invention is the rotatable shaft 13 which may be the driving shaft for the worm of a conventional stoker or may drive the coal feed mechanism through a suitable drive reduction transmission gearing. In any event, the mechanism operated by shaft 13 may be of any conventional construction and need not be further described. It is only important to understand that it is of such character that it may be subject to unpredictable conditions which slow rotation of shaft 13 relative to the pulley so as to produce a torque overload in the mechanism and thereby actuate the drive interrupting mechanism later described.

Pulley 11 is formed with a central hub 14 lined with a fixed bushing sleeve 15 surrounding the end of shaft 13 with a bearing fit. As illustrated in Figure 3, the outer end of shaft 13 projects a small amount beyond the outer end of hub 14 and bushing 15 which terminates at the end of the hub, and has fixedly secured thereto, as by set screw 17, a collar 16 which is annular and mainly cylindrical with a radially disposed flat stop or thrust face 18 formed on an integral external projection thereon. As illustrated this projection is mainly flat-surfaced to provide a suitable entry face for screw 17. Collar 16 is thus rigid with shaft 13 and comprises a drive connecting element between the shaft and the pulley.

As illustrated best at Figure 3, pulley 11 is somewhat recessed on its outer side at 19 and provided with an integral boss formation 20 on which is rigidly mounted, as by threaded fit with the carrier boss 20, a cylindrical pin 21 which extends outwardly parallel to the axis of shaft 13.

Pin 21 functions as a stationary pivot for a drive member 22 comprising a bell crank lever formed with intermediate boss portion 23 and two arms disposed at an obtuse angle projecting oppositely from said boss. Boss 23 is rotatably mounted on pin 21 and lever 22 is held against axial displacement thereon as by a suitable washer and fastener assembly 24. Member 22 comprises a pair of laterally spaced plates 25 and 26 rigid with opposite sides of hub 23 and carrying between their adjacent lower ends a cylindrical roller 27 freely rotatable about a pin 28 fixed at opposite ends to plates 25 and 26, as by peening over.

The upper arm of member 22 is at an obtuse angle to the arm carrying roller 27 and similarly carries a roller 29 freely rotatable about a pin 31 affixed at opposite ends to plates 25 and 26. Thus drive member 22 is freely pivoted intermediate its ends about pivot pin 21, and provided with freely rotatable anti-friction rollers 27 and 29 at its opposite angularly disposed ends.

Roller 29 is adapted to seat in bearing line contact with the radial flat stop face 18 of cam collar 16 when the parts are set for driving of the shaft 13 by pulley 11, as in the position illustrated in Figure 1. Face 18 must be of sufficient radial depth to permit roller 29 to be securely seated against face 18.

Radially spaced from hub 14, a pivot pin 32 is mounted on pulley 11 similarly to pin 21 to serve as a stationary pivot upon which is rockably mounted substantially midway between its ends a flat-sided, relatively narrow release rocker bar or lever 33. Near one end, bar 33 is formed with an elongated aperture 30 having a flat upper face 34 and longitudinally spaced arcuate recesses 35 and 36 opposite face 34. Intermediate recesses 35 and 36, the wall of aperture 30 opposite face 34 is formed with an internal projection 37 provided with a short flat face 37' preferably parallel to face 34 and an inclined camming face 38 extending from face 37' to merge with the arcuate wall of recess 36. The lower arm of drive member 22 embraces bar 33, plates 25 and 26 extending on opposite sides thereof and roller 27 being disposed in aperture 30 in either of recesses 35 or 36. Sufficient space is provided between faces 34 and 37' to permit passage of roller 27 between recess 35 and recess 36 during the below described operation.

Release rocker bar 33 is resiliently biased in a clockwise direction in Figures 1 and 2, as by a release spring 40 extending between suitable spring retainer collars 41 and 42 provided on cylindrical spring guide pins 43 and 44 mounted respectively on bar 33 and an anchor block 45 having a cylindrical part 46 journalled on pulley 11. Spring guide pin 44 is formed at its end remote from release spring 40 with a threaded portion 47 rotatably engaged with pivoted block 45, and a nut 48 mounted on said threaded portion 47 beyond pivoted block 45 is adjustable for determining the projection of pin 44 from block 45, whereby adjustment of nut 48 effects an adjustment of the compression of release spring 40 and thereby controls the value of the torque load which may be transmitted by the mechanism prior to interruption of the drive.

In operation, the drive member 22 and bar 33 are usually set in the drive position illustrated in Figure 1, wherein roller 29 is disposed against radial face 18 of the cam collar and roller 27 is disposed in recess 35, the parts being maintained in this position by the expansive force of spring 40 which reacts against the anchor at 45. Spring 40 is of sufficient strength to maintain roller 27 in recess 35 and roller 29 against face 18 during normal drive. The cylindrical surface of collar 16 at the base of stop face 18 serves as a stop limiting clockwise rotation of drive member or lever 22 by spring 40.

With the parts in the set position of Figure 1, motor driven rotation of pulley 11 positively rotates shaft 13, the drive force being transmitted through lever 22 and roller 29 between pin 21 and face 18. The line between the centers of pin 21 and roller 27, representing the direction of the drive force, is at an obtuse angle $\alpha$ with respect to face 18 so that were it not for spring 40 and bar 33, action of the drive force would simply cause roller 29 to travel radially outwardly on face 18 and immediately break the drive connection. However, the force of spring 40 acting through lever 33 to urge lever 22 clockwise compensates for such tendency of the drive force to rock lever 22 counterclockwise during normal drive, and when there is no obstruction to rotation of shaft 13 beyond the normal inertia of the coal or other material being fed. Thus the absolute force of spring 40 must be correlated to the angle α.

Suppose now that rotation of shaft 13 becomes restrained or blocked, as in the case of a coal stoker where an oversized piece of coal or a stone becomes lodged between the worm and conveyor tube. Shaft 13 slows relative to pulley 11 and now resists rotation more than in normal feed drive, and more torque is needed to continue to rotate it with pulley 11. Since, due to the angularity of the drive force and face 18, a certain component or proportion of the drive force always tends to rock lever 22 away from cam face 18, it is apparent that an increase in the driving torque will proportionately increase the force tending to rock lever 22 counterclockwise. As soon as the drive torque increases a predetermined amount, therefore, the increased component of force tending to rock lever 22 counterclockwise overcomes the compensative force of the resilient latch comprising spring 40 and lever 33, which latter force remains unchanged, and lever 22 is rocked counterclockwise and roller 29 is cammed radially along and beyond face 18 to break the drive connection so that pulley 11 rotates freely with respect to shaft 13.

Counterclockwise rocking of lever 22 under the influence of the increased drive force results in roller 27 riding over projection 37 and becoming lodged in recess 36 where it is maintained or latched by the action of spring 40 so as to positively retain lever 22 out of drive contact with cam collar 16. This position of the parts is illustrated in Figure 2, a slight rocking of lever 33 against the action of spring 40 permitting the shift of roller 27 between recesses 35 and 36.

The above action takes place very speedily particularly because of the substantially frictionless connection between roller 29 and radial face 18, and between roller 27 and bar 33. Due to these substantially frictionless engagements it will be seen that the entire mechanism is very sensitive in operation and very speedily shifts between the positions shown in Figures 1 and 2 whereby the drive is automatically and instantaneously disconnected almost the moment that a torque overload condition is attained. This trigger-like action is of great value in preventing damage to the apparatus.

The use of a compression spring as at 40 to continually urge the parts together provides an extremely steady and positive spring pressure control which is not available in many prior devices utilizing tension springs for similar purpose, and the sensitive adjustment afforded by rotation of nut 48 enables the spring to be adjusted through an appreciable range of torsion trip values. This is a very sensitive and reproducible control of the trip value of the mechanism which may also be used to compensate for wear in the parts, and is a very important feature of the invention.

After the obstruction has been taken away, the parts may be set into the position of Figure 1 simply by manually pushing downwardly on the upper part of lever 22 so that roller 29 becomes disposed behind stop face 18, spring 40 permitting the slight rocking movement of bar 33 necessary to allow roller 27 to pass from recess 36 over projection 37 and into recess 35 and camming face 38 facilitating that return movement of roller 27. Spring 40 holds the parts in the reset position. The apparatus may thus be reset for immediate use without special equipment or tools and in a minimum time.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In an overload release mechanism, a drive member and a driven member adapted to be rotated together, one of said members having a radial thrust face, a drive arm pivoted on the other of said members having a roller adapted to bear on said face, and a resiliently biased rocker bar pivoted on said other member formed with spaced recesses, and another roller on said drive arm adapted to seat in either of said recesses.

2. In a torsional overload release mechanism embodying rotatable drive and driven members, a drive transmission lever pivoted on one of said members, cooperating separable drive surfaces on said other member and one end of said lever, and a pivoted resilient latch element for said lever mounted on said one member operably connected to the other end of said lever and adapted to hold said lever either in operative drive transmitting contact with said other member or in a position where said drive surfaces are separated and the drive is interrupted.

3. In a torsional overload release device wherein rotatable drive and driven members are connected by trip mechanism, a generally radial thrust face rigid with said driven member, a drive lever pivoted intermediate its ends on said drive member and adapted at one end for abutting contact with said thrust face, a rocker lever pivoted on said driven member and operatively coupled to the other end of said drive lever, and a compression spring on said drive member acting on and through said rocker lever for maintaining said drive lever either in abutting contact with said face whereby said drive member rotates the driven member or out of engagement with said face whereby the driven member is not rotated by the drive member.

4. In a device defined in claim 3, wherein said drive lever has substantially frictionless roller contact with said stop face and said rocker lever for increasing the sensitivity of said device to provide speedy drive interruption upon torsional overload.

5. In a torsional overload release mechanism adapted to releasably interconnect rotatable drive and driven members, a drive transmission lever pivoted on one of said members and adapted to be operatively connected to the other of said members, a pivoted latch bar on said one member formed with spaced recesses alternatively engageable with a part on said lever, and resilient means acting on said latch bar to releasably latch said lever against pivotal movement when said part is disposed in either of said recesses.

6. In the mechanism defined in claim 5, said resilient means comprising an adjustable strength compression spring.

7. In the mechanism defined in claim 5, a rockable anchor on said one member, and a compression spring between said anchor and said latch bar.

8. In a torsional overload release mechanism, rotatable drive and driven members, a generally radial face on one member, a latch bar pivoted on the other member and formed with spaced recesses, a lever pivoted on said other member, two rollers on said lever respectively adapted to engage said face and either of said recesses, a spring acting on said latch bar for permitting movement of said associated roller between said recesses and releasably holding said lever against pivotal movement with the associated roller disposed in either of said recesses.

9. In an overload release mechanism, rotatable drive and driven members, a bell crank pivotally mounted on one of said members with one end separably drive connected to said other member, and a resiliently biased pivoted latch on said one member coupled to the other end of said bell crank.

CORTICE H. HALL.

REFERENCES CITED

The following references are of record in the file of this patent:

UNITED STATES PATENTS

| Number | Name | Date |
|---|---|---|
| 1,883,225 | Wood | Oct. 18, 1932 |
| 2,003,115 | Grohn | May 28, 1935 |
| 2,202,497 | Landahl | May 28, 1940 |

FOREIGN PATENTS

| Number | Country | Date |
|---|---|---|
| 321,702 | Great Britain | Nov. 8, 1929 |
| 401,124 | Germany | Mar. 23, 1909 |

Disclaimer 2,425,736.—*Cortice H. Hall*, Detroit, Mich. OVERLOAD RELEASE MECHANISM. Patent dated Aug. 19, 1947. Disclaimer filed Feb. 23, 1949, by the assignee, *The Timken-Detroit Axle Company*.

Hereby enters this disclaimer to claim 9 of said patent.

[*Official Gazette March 22, 1949.*]